US007925992B2

(12) United States Patent
Wasmund

(10) Patent No.: US 7,925,992 B2
(45) Date of Patent: Apr. 12, 2011

(54) METHOD TO ASSIST USERS IN PREVENTING ERRORS WHEN USING TYPE-AHEAD

(75) Inventor: Michael Wasmund, Tuebingen (DE)

(73) Assignee: International Business Machines Corporation, Armonk, NY (US)

(*) Notice: Subject to any disclaimer, the term of this patent is extended or adjusted under 35 U.S.C. 154(b) by 496 days.

(21) Appl. No.: 12/129,717

(22) Filed: May 30, 2008

(65) Prior Publication Data
US 2009/0300491 A1 Dec. 3, 2009

(51) Int. Cl.
*G06F 3/048* (2006.01)
(52) U.S. Cl. ........ 715/816; 715/811; 715/815; 715/821; 715/825
(58) Field of Classification Search .................. 715/815, 715/816, 821, 825
See application file for complete search history.

(56) References Cited

U.S. PATENT DOCUMENTS

| | | | |
|---|---|---|---|
| 6,377,965 B1 | 4/2002 | Hachamovitch et al. | |
| 6,658,386 B2* | 12/2003 | Kemble et al. | 704/270 |
| 6,801,190 B1* | 10/2004 | Robinson et al. | 345/173 |
| 6,952,805 B1 | 10/2005 | Tafoya et al. | |
| 7,032,072 B1 | 4/2006 | Quinn et al. | |
| 7,111,248 B2* | 9/2006 | Mulvey et al. | 715/812 |
| 7,181,497 B1 | 2/2007 | Appelman et al. | |
| 7,320,019 B2 | 1/2008 | Malik | |
| 2004/0153519 A1 | 8/2004 | Stolze | |
| 2004/0172455 A1 | 9/2004 | Green et al. | |
| 2005/0198144 A1 | 9/2005 | Kraenzel et al. | |
| 2006/0165289 A1 | 7/2006 | Boss et al. | |
| 2007/0074131 A1* | 3/2007 | Assadollahi | 715/816 |
| 2007/0157075 A1 | 7/2007 | Ritter | |

* cited by examiner

*Primary Examiner* — Steven P Sax
*Assistant Examiner* — Andrey Belousov
(74) *Attorney, Agent, or Firm* — McGinn IP Law Group, PLLC

(57) ABSTRACT

A method and system to provide selection of entries in input fields, such as email client, includes pre-processing a list of potential addresses before the list is shown to a user by eliminating less important or invalid entries, and then displaying a list of entries for selection to the user in a format which highlights the most probable address to support selection of a "right" address.

1 Claim, 5 Drawing Sheets

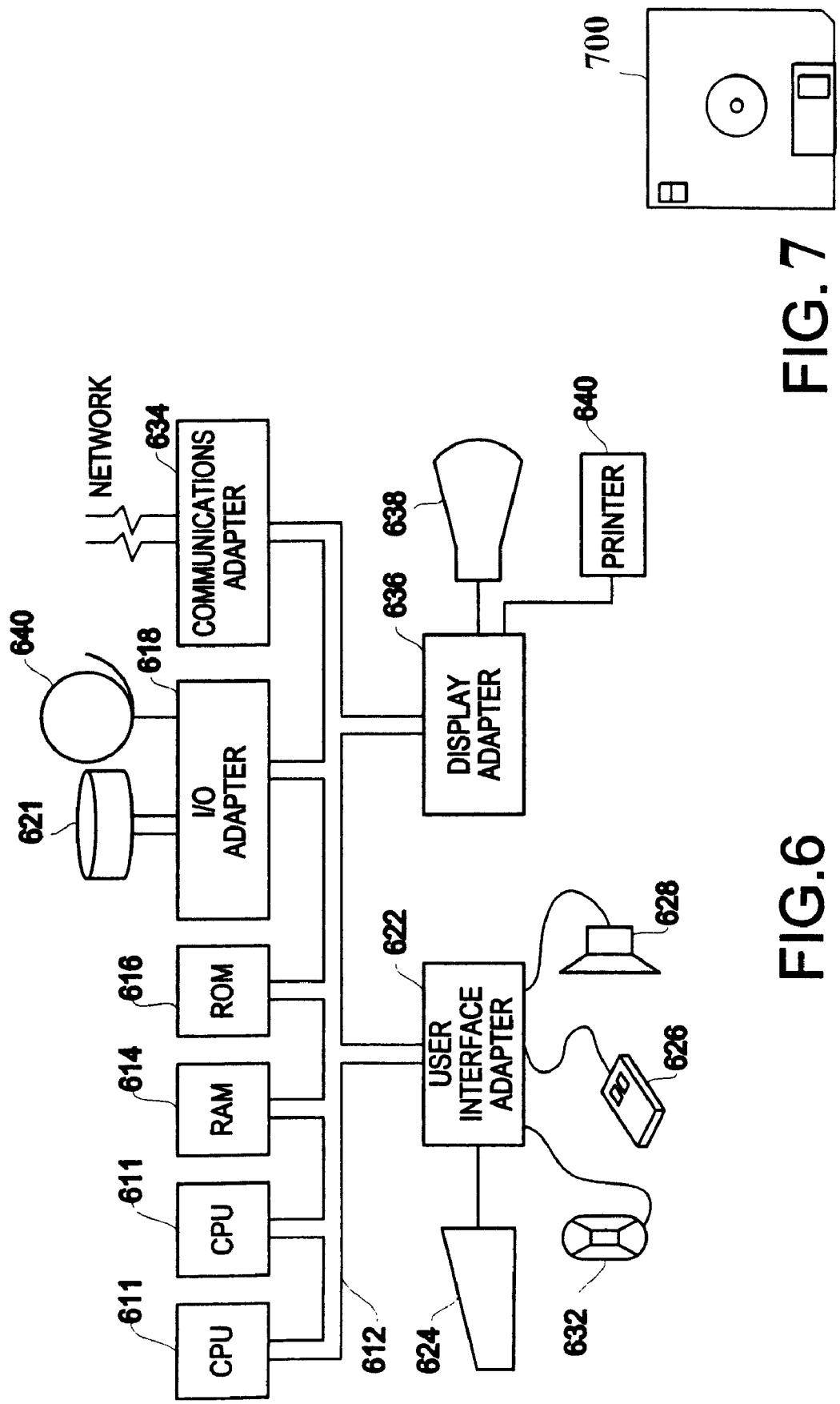

METHOD TO ASSIST USERS IN PREVENTING ERRORS WHEN USING TYPE-AHEAD

BACKGROUND OF THE INVENTION

1. Field of the Invention

The present invention relates to the field of selection of entries in input fields, and more particularly to a method and system for quick selection of entries in an email client.

2. Description of the Related Art

Conventional email clients like Lotus Notes 8®, Microsoft Outlook®, or other software applications such as search engines (e.g., Google®) provide a type-ahead feature when inputting some required information like destination addresses for mail. For example, IBM's product Lotus Notes 8® reviews records of all recently addresses destinations and suggests to a user a list of addresses such that just one of them can be selected.

Although such a feature greatly speeds up finalizing mails and sending them, the feature also carries a risk that a user accidentally selects a wrong entry in a list of proposed destinations. This is particularly relevant when, for example, a user has sent a mail to two different persons named "Rolf Schmidt". Since the user has sent such mail to the two persons, the two names are listed and the user may be tempted to select the first one which may in fact be the wrong one.

Sending mail to a wrong destination can have severe disadvantages including delays resulting from a lack of response from an addressee, a need for re-sending a mail, breach of confidentiality, etc.

SUMMARY OF THE INVENTION

The present invention provides a method and system for selection of entries in input fields, such as email clients.

The invention includes the following steps in quick selection of an email client:
a) pre-processing a list of potential addresses before the list is shown to a user by eliminating less important or invalid entries; and
b) displaying a list of entries for selection to the user in a format which highlights the most probable address to support selection of the "right" address.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 illustrates an exemplary hardware/information handling system 600 for incorporating the present invention therein;

FIG. 7 illustrates a signal bearing medium 700 (e.g., storage medium) for storing steps of a program of a method according to the present invention.

DETAILED DESCRIPTION OF EXEMPLARY EMBODIMENTS OF THE INVENTION

Figure 1:
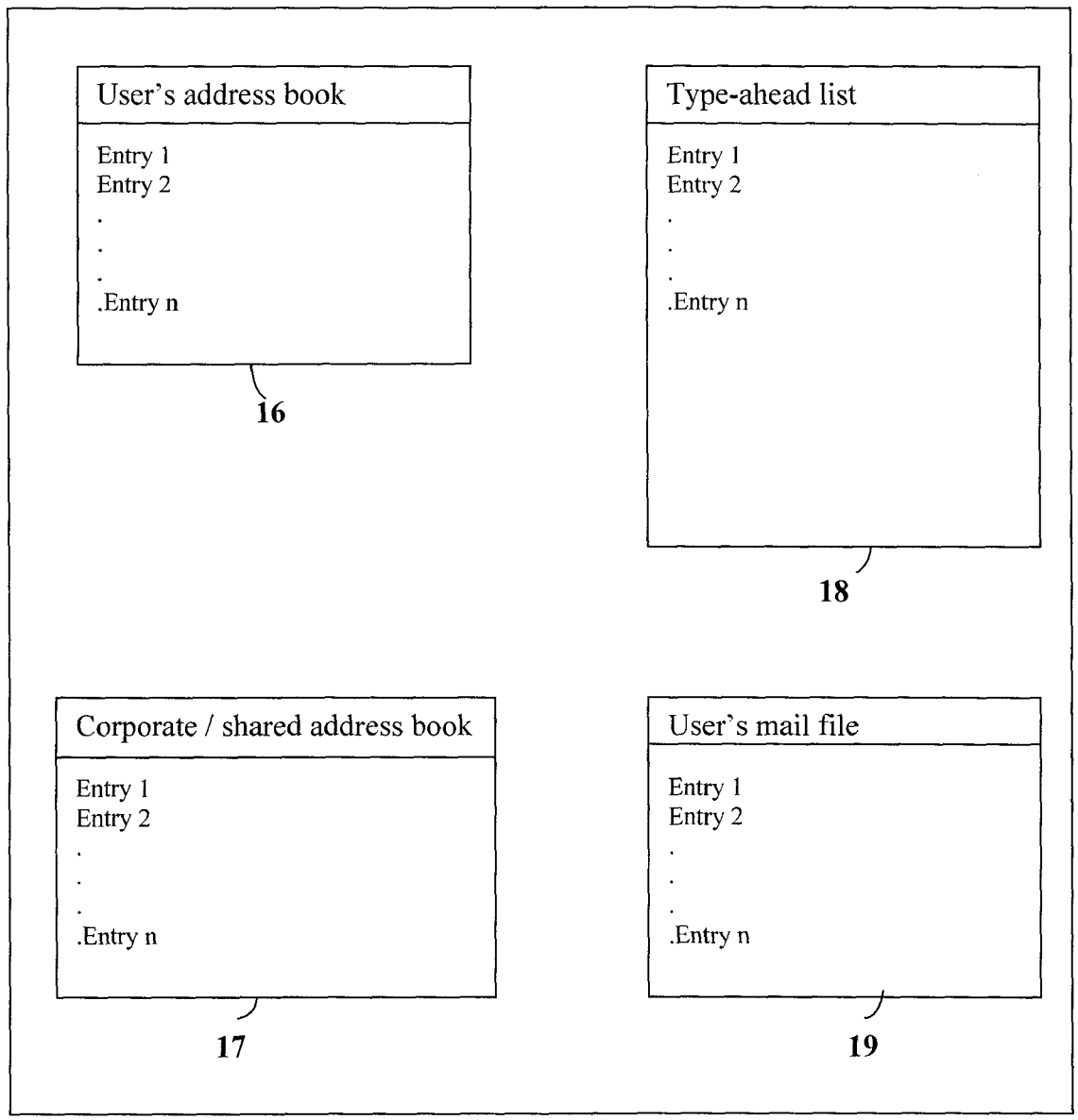
FIG. 1 illustrates basic components of a system for preventing errors when using type-ahead according to an exemplary aspect of the present invention.

Referring now to the drawings, and more particularly to FIGS. 1-8, there are shown exemplary embodiments of the method and structures according to the present invention.

Exemplary Embodiment

The novel features of the invention can be applied to all kinds of email client systems and generally software systems used for communications that require quick selection of entries in input fields.

Beyond recording "sent to" addresses in the background, the email client periodically "cleans" (i.e., updates or revises) the list according to a set of user-defined or system-defined criteria (or a combination of those criteria), based on any more or more of the following steps or citeria:

entries not used for a configurable amount of time are removed;

entries which generated a "mail returned" event are removed;

entries which do not match an entry in a corporate directory anymore are removed;

entries which correspond to an entry in a user's directory (e.g., permanent address book) are "not" removed; and when a user removes an entry from his/her permanent address book, then the corresponding entry in the "send to" list is also removed.

The removal of entries can happen silently (i.e., transparently to the user) or with user involvement (e.g., by prompting the user for confirmation of removal).

In practice, removal can be performed optionally, since the list is only a convenience to the user.

The remaining list entries are displayed to the user in at least one of the following ways:

entries which have been frequently used are displayed more boldly than those which have been rarely used;

entries which have been frequently used are displayed in a special color, compared to entries which have been rarely used;

or any other means of "highlighting" of frequently-used entries, such as animation or the like; and systems which do not support highlighting could append to the address in brackets to show the number of uses (e.g., Rolf.Schmidt@chance.com [8]).

Accessibility: In a voice-operated system, the most frequently used entry would be presented first for selection.

Consequently, the entry for the "right" "Rolf Schmidt" would be highlighted, while the entry for the "wrong" "Rolf Schmidt" which has been used only once mistakenly (i.e., a predetermined time ago, such as weeks ago), is not highlighted.

The notion of "frequently used" is taken from the number of mails sent to that user and can be set selectively by the designer or user of the saystem. "Frequently used" may be transformed into a weight (integer) attached to the address entry.

Referring to FIG. 1, an embodiment of a system according to the present invention is shown. FIG. 1 shows the basic components of a system for preventing errors when using type-ahead including:

The user's local address book 16, which contains addresses of the user's contacts. The local address book forms one basis of computing the "type-ahead" list presented to the user.

A corporate/shared address book 17, which contains a list of potential addresses shared among users. The data contained can form another basis for computation of the type-ahead list.

The type-ahead list 18, which is a result of a computation which takes into account 16 and 17 to produce a sorted list of suggested target addresses. The list is presented to the user when typing the first letters of a target address, in which target address is an address to which a mail is intended to be sent.

The user's mail file 19, which contains all the emails which the user has sent or received. The invention uses the mail files to compare information in the mail file with information in the other components described later.

Figure 2:
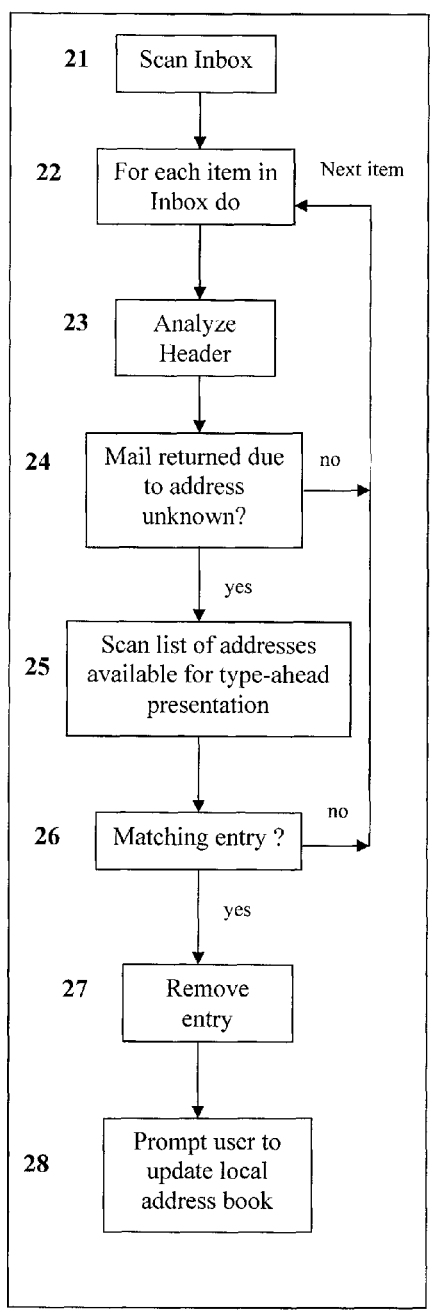
FIG. 2 illustrates a sequence of steps for cleaning (i.e., updating) a user's address book.

FIG. 2 depicts a sequence of steps 20 for cleaning (updating or revising) a user's address book 16 of invalid entries. The aim is to prevent invalid entries to be presented to the user as type-ahead suggestions. The steps are performed by a background task which runs periodically. The steps are as follows:

The process in step 21 opens the mail file 19 (i.e., of FIG. 1) of a user, and more specifically a selection which only shows "received" emails, called "inbox".

Step 22 initiates a loop which iterates through all entries in the inbox. Step 23 analyzes the header of every message in the inbox. Step 24 compares the header against a pattern which indicates emails which have been rejected due to "address unknown".

If the pattern does not match, then the iteration goes on. If the pattern matches, then the user's type-ahead list 18 is scanned (in step 25) for the same address entry. If such an entry is found in step 26, then the entry is removed from the user's type-ahead list 18 in step 27. The type-ahead list is therefore cleaned of that invalid entry.

In step 28 the user is prompted and asked whether that address which is considered as an invalid one, shall be removed from the address book 16. Alternatively, the user may have set preferences so that the process automatically is allowed to remove such entries.

Figure 3:
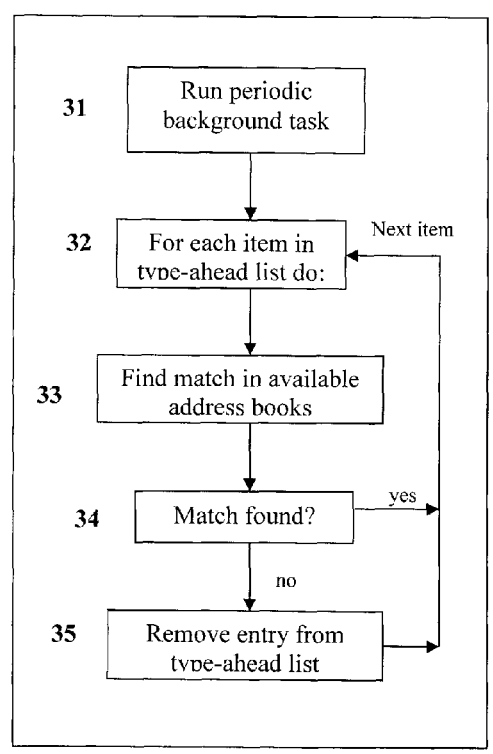
FIG. 3 illustrates a process for cleaning up (i.e., updating) a type-ahead list which may have been deleted from address books.

FIG. 3 depicts a process 30 used to clean up (i.e., modify, prune, revise, or update) the type-ahead list 18 of any entries which may have been deleted from address books 16 and 17. The process runs as a periodically invoked background task 31, iterating through all entries in the current type-ahead 18 list in step 32. For every entry in the type-ahead list, a corresponding entry is searched for step 32 in the address books 16 and 17.

If a match is found, then no modification is necessary and the process loops to step 32 for the next iteration. If a match is not found in step 34, then the type-ahead list 18 ought to be cleaned from this outdated entry in step 35, afterwards the loop continues back to step 32 with the next iteration until done.

Figure 4:
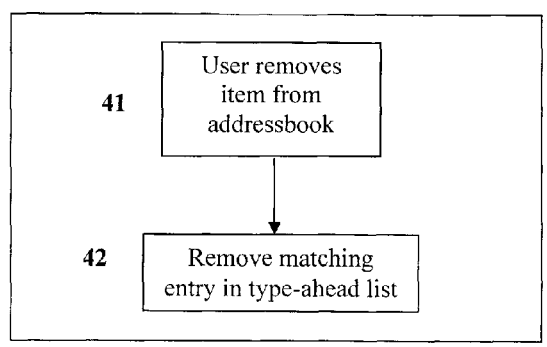
FIG. 4 illustrates a process for cleaning up (i.e., updating) a type-ahead list from entries which a user has removed from a local address book.

FIG. 4 shows a process 40 that is used to clean (modify) the type-ahead 18 list from entries which the user removed from the local address book 16. This process in principle achieves the same result as the process in FIG. 3, however not as a periodic background task but as an enhancement of user-initiated actions. Each time a user deletes an entry in the local address book in step 41, the type-ahead list 18 is searched for a corresponding entry. If a corresponding entry is found, then that entry is removed in step 42 to keep the type-ahead list short and free of entries which are either invalid or unlikely to be used.

Figure 5:
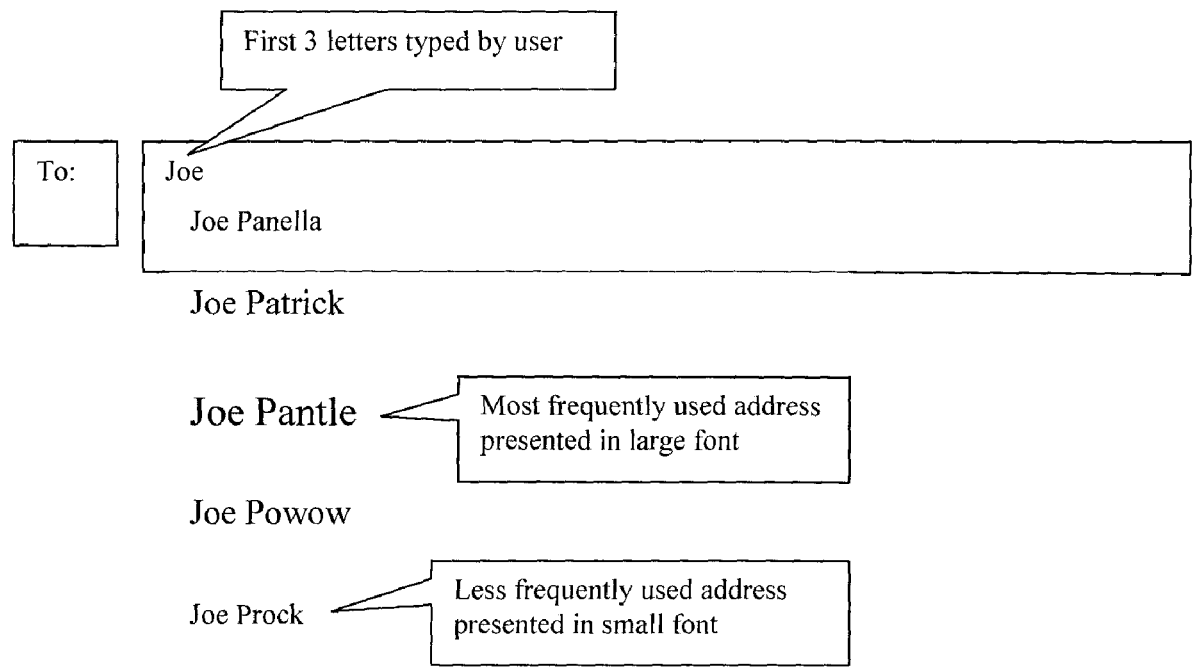
FIG. 5 illustrates a presentation of addresses from a type-ahead list.

FIG. 5 shows a presentation of addresses from a type-ahead list. The user types the first letters for the recipient's address in the text box. The system monitors the user's typing and presents a selection from the type-ahead list which expands the already typed letters. The expanded names are shown in font sizes which indicate frequency of use. In the depicted scenario, "Joe Pantle" was the most frequently used address and is therefore presented in the biggest font.

The "frequently used" parameter is determined by calculating a score. The score is calculated by multiplying the number of emails sent to that user by the number of emails received from the user. The method uses the product rather than the sum to prevent counting of cases where no email was sent to the user. In the latter case, received "spam" would otherwise be counted.

FIG. 6 illustrates a typical hardware configuration of an information handling/computer system for use with the invention and which preferably has at least one processor or central processing unit (CPU) 611.

The CPUs 611 are interconnected via a system bus 612 to a random access memory (RAM) 614, read only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 640.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 611, as represented by the fast access storage for example. Alternatively, the instructions may be contained in another signal bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

FIG. 7 illustrates a signal bearing medium 700 (e.g., storage medium) for storing steps of a program of a method according present invention.

Figure 8:
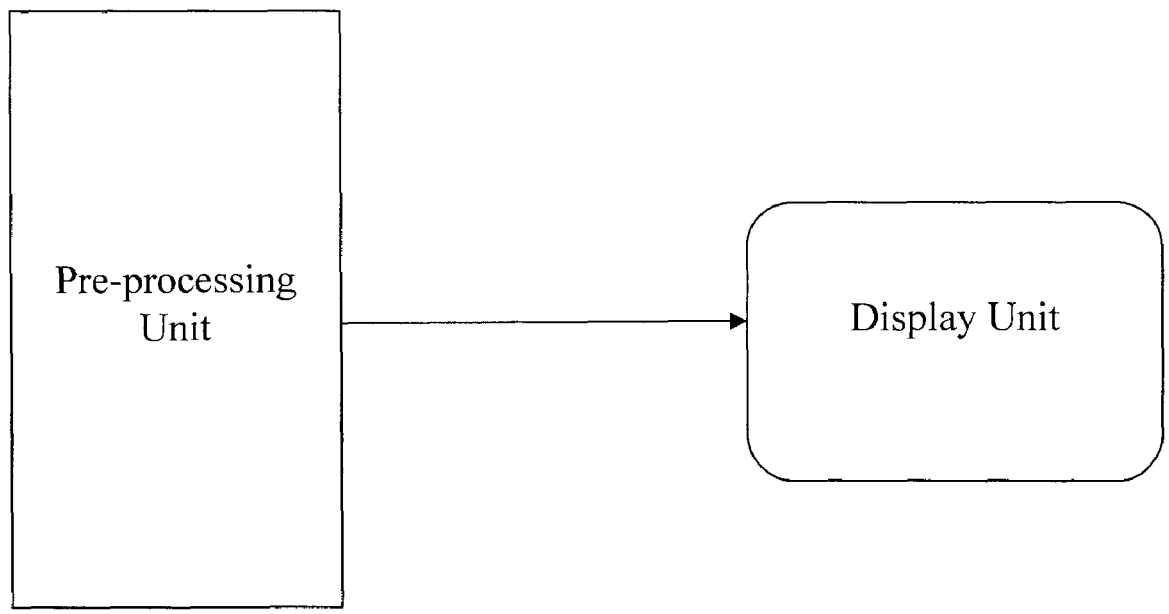
FIG. 8 illustrates a system for quick selection of an email client.

FIG. 8 shows a system for quick selection of an email client including a pre-processing unit 61 that pre-processes a list of potential addresses before the list is shown to a user by eliminating less important or invalid entries and a displaying unit 62 that displays a list of entries for selection to the user in a format which highlights the most probable address to support selection of the "right" address.

From the foregoing, it will be apparent to those skilled in the art that systems and methods according to the present invention are well adapted to overcome the shortcomings of the conventional methods.

While the invention has been described in terms of an exemplary embodiment, those skilled in the art will recognize that the invention can be practiced with modification within the spirit and scope of the appended claim.

Further, it is noted that, Applicant's intent is to encompass equivalents of all claim elements, even if amended later during prosecution.

What is claimed is:

1. A method of pruning type-ahead lists in email clients to prevent display of suggested recipient addresses which are invalid or unlikely to be used in an address book, while presenting a remaining list of type-ahead suggestions sorted by relevance, wherein the method highlights a most likely suggestion in a visible way and in an audible way, said method comprising:

calculating a score composed of a number of emails sent to a user multiplied by number of emails received from the user;

using said score to prevent received spam e-mail from being included in said type-ahead lists;

presenting suggested addresses for a recipient's address while the user types a predetermined number of characters of the recipient's address;

presenting suggested addresses for a recipient's address so that font sizes of the suggested addresses are derived from a number of prior uses of addresses;

presenting suggested addresses for a recipient's address so that a color of the suggested addresses is derived from said number of prior uses of the addresses;

presenting suggested addresses for a recipient's address so that a pitch of a tone reading out the addresses is derived from said number of prior uses of the addresses; and presenting suggested addresses for a recipient's address so that a volume of said tone of reading out the addresses is derived from said number of prior uses of the addresses, wherein if an entry reflects an address which is rejected by a mail processing system when sending a mail to the address, the entry is rated invalid, wherein if a mail sent to a recipient is returned to the user's address, the user is prompted for permission to remove an address that corresponds to an entry of the mail sent from the address book, and wherein if an address corresponding to an entry is removed from the address book, the entry is rated unlikely to be used.

* * * * *